United States Patent [19]
Lichtin et al.

[11] Patent Number: 5,395,076
[45] Date of Patent: Mar. 7, 1995

[54] SPACECRAFT VELOCITY CHANGE MANEUVERS BY VARIABLE ARCJETS

[75] Inventors: Daniel A. Lichtin, Cranbury; Kidambi V. Raman, East Windsor; Vasuki Subbarao, Plainsboro, all of N.J.

[73] Assignee: Martin Marietta Corporation, East Windsor, N.J.

[21] Appl. No.: 34,419

[22] Filed: Mar. 19, 1993

[51] Int. Cl.⁶ .......................... B64G 1/26; B64G 1/38; F03H 5/00
[52] U.S. Cl. ...................... 244/169; 244/170; 244/171
[58] Field of Search ............... 244/164, 169, 170, 171, 244/172, 176, 765, 78, 73

[56] References Cited

U.S. PATENT DOCUMENTS

| | | | |
|---|---|---|---|
| 3,735,591 | 5/1973 | Burkhart | 60/202 |
| 3,769,792 | 11/1973 | Grey | 60/39.28 |
| 4,550,888 | 11/1985 | Douglass et al. | 244/169 |
| 4,630,790 | 12/1986 | Williams, Jr. | 244/164 |
| 4,635,885 | 1/1987 | Hujsak | 244/169 |
| 4,767,084 | 8/1988 | Chan et al. | 244/169 |
| 4,848,706 | 7/1989 | Garg et al. | 244/169 |
| 4,931,942 | 6/1990 | Garg et al. | 244/164 |
| 4,961,551 | 10/1990 | Rosen | 244/172 |
| 5,098,041 | 3/1992 | Uetrecht | 244/172 |
| 5,140,525 | 8/1992 | Shanker et al. | 244/171 |
| 5,172,876 | 12/1992 | Rahn | 244/164 |
| 5,222,023 | 6/1993 | Liu et al. | 244/170 |
| 5,255,878 | 10/1993 | Rahn | 244/164 |
| 5,263,666 | 11/1993 | Hubert et al. | 244/169 |
| 5,310,143 | 5/1994 | Yocum et al. | 244/169 |
| 5,319,926 | 6/1994 | Steenborg | 60/203.1 |

FOREIGN PATENT DOCUMENTS

| | | | |
|---|---|---|---|
| 544297 | 6/1993 | European Pat. Off. | 244/164 |
| 128999 | 5/1990 | Japan | 244/172 |

OTHER PUBLICATIONS

AIAA 92-3529, "Power Conditioning Unit for Low-Power Arcjet Flight Application", by Skelly et al, AIAA/SAE/ASME/ASEE 28th Joint Propulsion Conference and Exhibit, Jul. 6-8, 1992, Nashville, TN.

*Primary Examiner*—Michael S. Huppert
*Assistant Examiner*—Virna Lissi Ansley
*Attorney, Agent, or Firm*—W. H. Meise; C. A. Berard; S. A. Young

[57] ABSTRACT

A spacecraft uses monopropellant arcjets for velocity change such as for north-south stationkeeping. It has been discovered that, while an arcjet cannot be modulated by pulsing the fuel supply, the amount of thrust can be varied by modulating the power applied to the arc, without extinguishing the arc. While the specific impulse ($I_{SP}$) of the arcjet is thereby reduced from the maximum $I_{SP}$ of which the arcjet is capable, the resulting $I_{SP}$ may still be larger than the combined $I_{SP}$ of an unmodulated arcjet in conjunction with a modulated chemical thruster in a typical scenario. According to the invention, attitude control is provided in conjunction with north-south stationkeeping or other velocity change by, in response to an error signal generated by an attitude control system, modulating the arc power(s) of an arcjet thruster(s), which provides the velocity change. The arc is not extinguished during the stationkeeping maneuver, but is varied in magnitude. In addition to improving the overall $I_{SP}$, an arrangement according to the invention allows dispensing with the chemical thrusters on the north face, thereby reducing spacecraft weight and complexity. Reliability is not seriously affected, because failure of arc allows an arcjet to continue to be used as a chemical thruster.

9 Claims, 3 Drawing Sheets

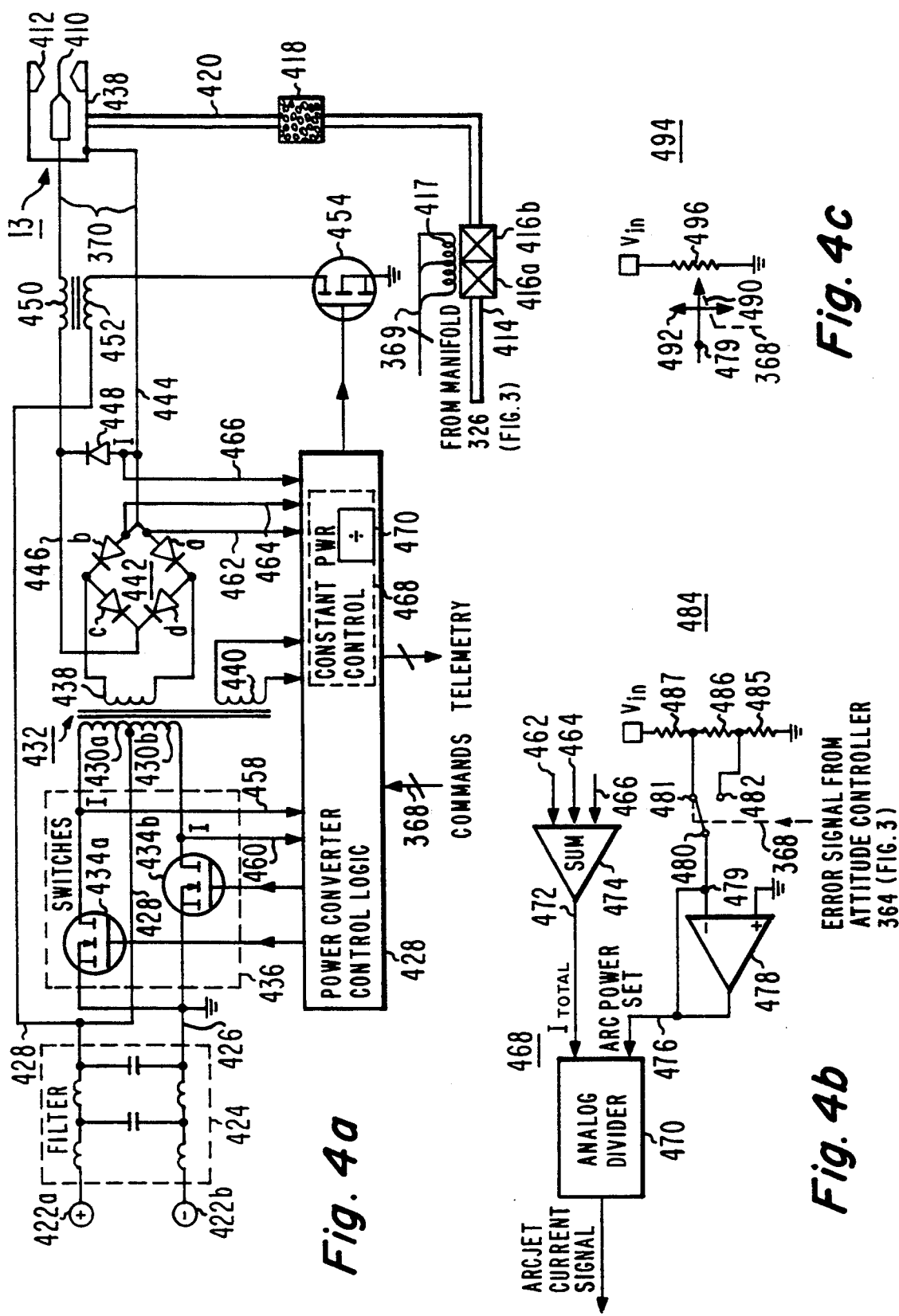

SPACECRAFT VELOCITY CHANGE MANEUVERS BY VARIABLE ARCJETS

This invention relates to spacecraft velocity, attitude and stationkeeping control systems, and more particularly to spacecraft stationkeeping and attitude control by use of arcjets with variable power.

BACKGROUND OF THE INVENTION

FIG. 1 is a simplified representation of a prior art spacecraft 10 in a geosynchronous orbit about Earth 12. Spacecraft 10 may be a communications satellite carrying a payload of transponders and antennas (not illustrated). As illustrated in FIG. 1, spacecraft 10 includes a body 18 associated with pitch, roll and yaw axes. In order to perform its communication or other function, spacecraft 10 must maintain its body 18 in a controlled orientation. The spacecraft may include an earth horizon sensor, illustrated as 28, and other sensors (not illustrated) for aiding in determining attitude, and may also include magnetic torquers (not illustrated) and/or reaction wheels or momentum wheels (not illustrated) to provide a measure of orientation or attitude control. A desired orientation might maintain, as illustrated, north face 20 of body 18 orthogonal to the pitch axis, east face 22 orthogonal to the roll axis, and the earth-facing side (not visible in FIG. 1) and anti-earth side 26 orthogonal to the yaw axis.

Ordinary orbital motions of the spacecraft tend to cause drift in a north-south direction away from the desired station. In the prior-art arrangement of FIG. 1, chemical thrusters designated 1, 2, 3 and 4 are located near the corners of north face 20. Other thrusters, representatively illustrated as thrusters 7 and 8 on east face 22, are also provided. Such chemical thrusters operate by expelling propellant mass heated by means of a chemical reaction. Such a chemical reaction may be based upon a bipropellant fuel-oxidizer system or upon a monopropellant-catalyst system, such as one which uses hydrazine propellant.

Also in FIG. 1, four electrothermal arcjet thrusters or "arcjets" designated 13, 14, 15 and 16 are located on north face 20, on either side of a conceptual bisecting line 24, which lies in a plane parallel to the pitch-roll plane (i.e., parallel to the plane which includes the pitch and roll axes). Arcjets such as 13–16 (where the hyphen represents the word "through") use the electrical energy of an arc to increase the enthalpy of propellant mass originating from a chemical reaction similar to that of the chemical thrusters. The energy of the electrical arc results in an increased specific impulse ($I_{SP}$) of an arcjet over an equivalent chemical thruster. Specific impulse is a measure of the thrust resulting from a rate of propellant mass expulsion, with dimensions of lbf/lbm/sec=sec. An unaugmented hydrazine Rocket (or Reactive) Engine Assembly (REA) thruster operated in an on-pulsed mode has a specific thrust of about 150 seconds. An Electrothermal Hydrazine Thruster (EHT), which uses an electrical resistance heater to augment chemically derived propellant energy, has specific thrust in the range of 300 seconds, while an arcjet may reach 600 sec. The advantage of the arcjet is so great that it is used wherever possible, to the exclusion of other thrusters. U.S. patent application Ser. No. 07/285,699 filed Dec. 16, 1988 in the name of Davies et al now U.S. Pat. No. 5,263,666, describes advantages to exclusive use of monopropellant thrusters for attitude control and North-South stationkeeping. Stationkeeping maneuvers are performed by energizing a diagonally opposed pair of arcjets, such as the pair 13, 15 or the pair 14,16. This operation is performed around the ascending node of the orbit. Ideally, the arcjets of the pair would produce exactly the same amount of thrust, with the lines of action of the thrust mutually parallel, and at equal distances from the center of mass (not illustrated) of the spacecraft. With such an ideal condition, the station of the spacecraft could be corrected without affecting the attitude.

The various imbalances of the spacecraft and the thrust tend to result in a change in attitude as the stationkeeping arcjets are fired. These changes in attitude are sensed by the attitude control system (not separately illustrated), which energizes one or more of the monopropellant thrusters 1–4 on the north face, and possibly thrusters on other faces, to maintain correct attitude. The magnitude of the thrust of the desired attitude control thrusters is controlled by on- or off-pulsing, in known manner. The arcjets are not on-off pulsed, because they can be ignited only a limited number of times due to various factors such as cathode erosion and thermal stresses. It is desirable, when making the aforementioned attitude corrections, to use north-face thrusters 1–4 insofar as possible, to the exclusion of thrusters on other faces, because the attitude control thrust is in the direction of the desired stationkeeping thrust, and contributes to the desired velocity. Thrust on faces other than the north face does not so contribute. Thus, greatest propellant usage efficiency results, in the arrangement of FIG. 1, from operating arcjets 13–16 to obtain the desired stationkeeping thrust, and operating chemical thrusters 1–4 to maintain attitude during the stationkeeping maneuver.

It should be noted that, while the arcjets have high specific thrust, they do not necessarily have a large thrust, and in fact the arcjet thrust may be smaller than the thrust of a chemical thruster used therewith for attitude control. Therefore, the arcjets, once ignited may be operated for many minutes or even for hours, to achieve the desired velocity change.

SUMMARY OF THE INVENTION

It has been discovered that, while an arcjet cannot be modulated in an on-off manner without degradation, the amount of its thrust can be varied by modulating the power applied to the arc, without extinguishing the arc. While the specific impulse ($I_{SP}$) of the arcjet is thereby reduced from the maximum $I_{SP}$ of which the arcjet is capable, the resulting $I_{SP}$ may still be larger than the combined $I_{SP}$ of an unmodulated arcjet in conjunction with a modulated chemical thruster in a typical scenario. According to the invention, attitude control is provided in conjunction with north-south stationkeeping by, in response to error signals generated by an attitude control system, modulating the power of the arc(s) of that arcjet thruster(s) which provides north-south stationkeeping thrust. In addition to improving the overall $I_{SP}$, an arrangement according to the invention allows dispensing with the chemical thrusters on the same face as the arcjets, thereby reducing spacecraft cost, weight and complexity. Reliability is not seriously affected if the arcjet is fueled with decomposed hydrazine, because failure of an arc allows it to continue to be used as a chemical thruster.

DESCRIPTION OF THE DRAWINGS

FIG. 4a is a simplified block diagram of an arcjet thruster of FIG. 3 and its association with other elements, FIG. 4b illustrates an arrangement for changing the power set-point, and FIG. 4c illustrates an arrangement for continuous, rather than stepped, power set-point control.

DESCRIPTION OF THE INVENTION

Figure 1:
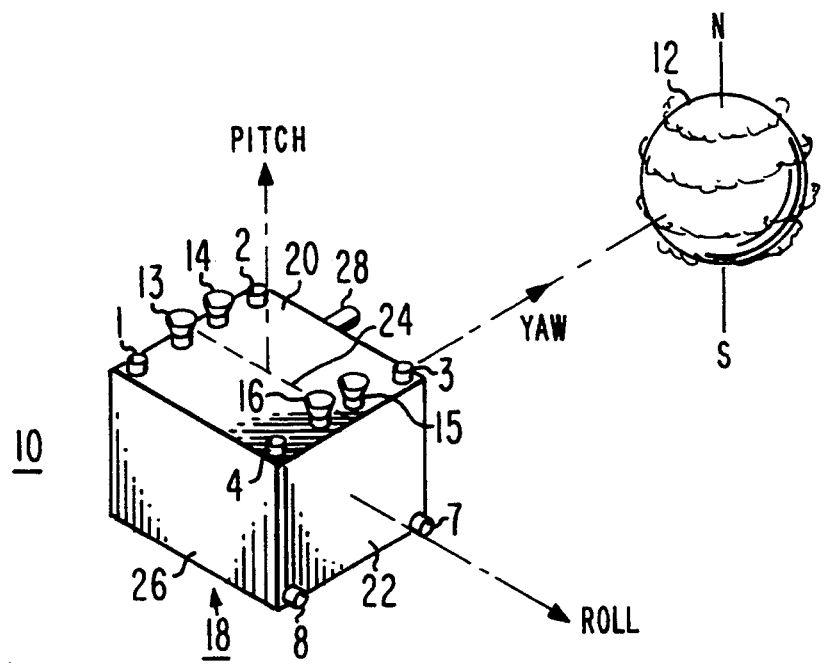
FIG. 1 is a simplified perspective or isometric view of a prior art spacecraft.
Figure 2:
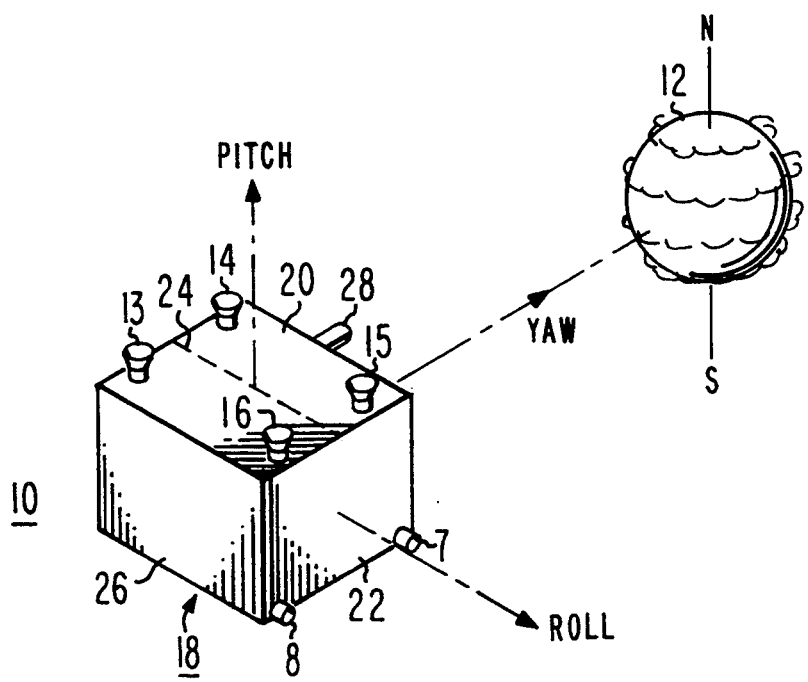
FIG. 2 is a simplified perspective or isometric view of a spacecraft according to the invention.

FIG. 2 is a perspective or isometric view of a spacecraft according to the invention. Elements of FIG. 2 corresponding to those of FIG. 1 are designated by like reference numerals. The salient difference between the spacecraft of FIGS. 1 and 2 is that the spacecraft according to the invention does not include attitude control thrusters 1–4 on its north face 20, and arcjets 13–16 have been relocated toward the locations formerly occupied by chemical thrusters 1–4. Naturally, a spacecraft using the invention may retain the chemical thrusters, if desired, for added redundancy.

Figure 3:
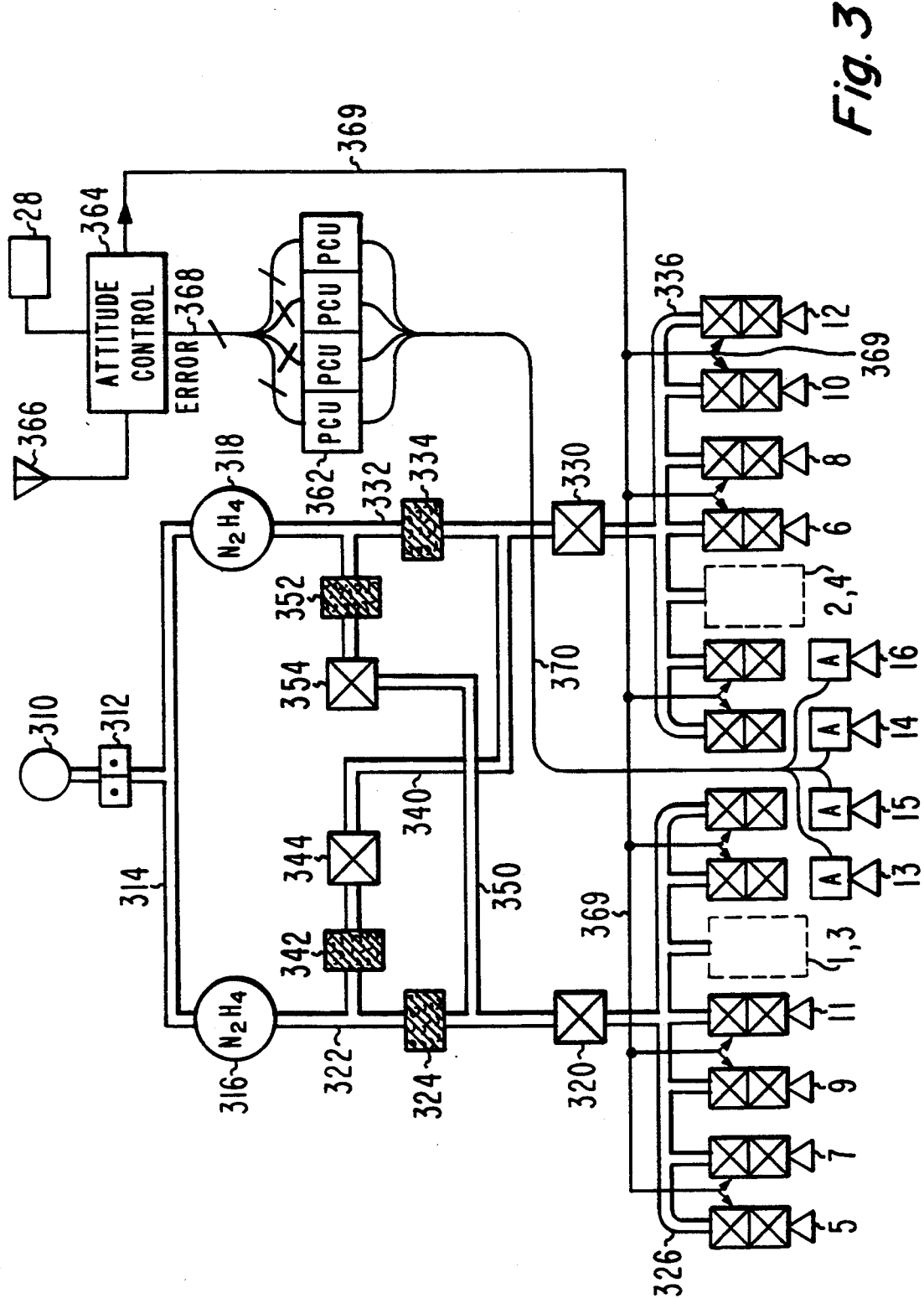
FIG. 3 is a simplified block diagram of fuel distribution, arc modulation and attitude control portions of the spacecraft of FIG. 2.

FIG. 3 is a simplified block diagram of the propellant and thruster system of the spacecraft of FIG. 2. Elements of FIG. 3 corresponding to elements of FIG. 2 are designated by like reference numerals. In FIG. 3, a tank 310 provides pressurized gaseous helium by way of a normally-closed pyro valve 312 and a manifold 314 to propellant tanks 316 and 318. Tanks 316 and 318 contain liquid hydrazine ($N_2H_4$). Under normal conditions, a controllable valve 320 allows propellant to flow through a pipe 322 and a filter 324 to a manifold 326, which distributes propellant to chemical thrusters 1 and 3 (if they are used), 5, 7, 9 and 11, and also to arcjets 13 and 15, all of which are associated with an odd half-system. Similarly, a controllable valve 330 allows propellant to flow through a pipe 332 and a filter 334 to a manifold 336, which distributes propellant to chemical thrusters 2 and 4 (if used), 6, 8, 10 and 12, and also to arcjets 14 and 16, which are associated with an even half-system. Either the odd or even half-system is capable of providing attitude control. Each thruster includes a redundant pair of cascaded valves (illustrated by Xs) for controlling fuel flow. In the event that both valves of a thruster should fail open, which would allow propellant to escape, the corresponding main valve 320 or 330 may be closed to prevent the corresponding half-system propellant tank from being emptied. A first redundant propellant redirection system includes a pipe 340, filter 342 and valve 344, which allows propellant to be supplied to the even thrusters 6, 8, 10, 12, 14, 16 from tank 316 when valve 320 is closed or filter 324 is clogged. A second propellant redirection system includes a pipe 350, filter 352, and controllable valve 354, which allows fuel to be routed from propellant tank 318 to the thrusters 5, 7, 9, 11, 13, 15 of the odd half-system when valve 330 is closed or filter 334 is clogged.

FIG. 3 illustrates an arc electrode block designated A associated with each arcjet thruster 13, 14, 15 and 16. Each electrode block A is connected by electrical conductors of a control/power bus, illustrated collectively as 370, to a corresponding power control unit (PCU), designated jointly as 362. In FIG. 3, the attitude control sensors are illustrated as 28, and the attitude controller is illustrated as a block 364. Controller 364 may be in communication with a ground station for being commanded therefrom, as suggested by antenna symbol 366. In normal attitude control operation, when stationkeeping thrust is not desired, controller 364 uses the signals from sensor(s) 28 to produce error signals on a data path set 368, which are applied (by paths and equipment not illustrated) for pulse-width modulation control of the propellant valves X of the various chemical thrusters for attitude control. When stationkeeping thrust is required, the propellant valves X of at least one pair 13, 15 or 14, 16 of arcjets are turned on to provide fuel flow. The error signal representative of attitude is applied from attitude controller 364 to the power control units 362 for controlling the energy of the arc as described below, to thereby modulate the arcjet thrust for maintaining attitude without invoking the chemical thrusters.

FIG. 4 is a simplified block diagram of an arcjet, together with its power control unit (PCU). For definiteness, arcjet 13 of FIG. 3 is described. In FIG. 4, arcjet 13 includes electrodes 410 and 412 associated with a chamber 438. Propellant is supplied to chamber 438 by a pipe 414 from manifold 326 of FIG. 3, and is gated by cascaded valves 416a and 416b under the control of solenoids 417 energized under the control of signals applied over a conductor bus 369. When valves 416a and 416b are both open, hydrazine flows through catalyst bed 418 for decomposition. The decomposed hydrazine is applied through a pipe 420 to chamber 438 of arcjet 13 for generating chemical thrust.

A pair of terminals 422a and 422b at the left of FIG. 4a receive direct voltage from the spacecraft electrical system, and couple energy through an electromagnetic interference (EMI) filter 424. One output conductor 426 of filter 424 is connected to a ground reference, and the other output conductor 428 is connected to a center-tap of a primary winding 430a, 430b of a transformer 432. Two FET switches 434a and 434b of a switching circuit 436 have their sources connected to ground, and their drains connected to the free ends of primary windings 430a and 430b, respectively. The gate electrodes of FETs 434a and 434b are coupled to power converter control logic 428, for alternating control in a pulse-width modulated manner. The switched electrical power applied to transformer primary windings 430a and 430b results in inducement of an alternating voltage across a main secondary winding 438 and a voltage sensing secondary winding 440. The sensed voltage from winding 440 is applied to power converter control logic 428, and the main secondary voltage is applied from winding 438 to a bridge rectifier designated 442. Bridge rectifier 442 includes diodes designated a, b, c and d, which rectify the alternating voltage applied thereto from winding 438, and generate a pulsating direct voltage between a conductor 444 and a conductor 446, poled to reverse-bias a catch diode 448 connected therebetween. Conductor 444 is connected to arcjet electrode 412. An inductor 450 couples conductor 446 to arcjet electrode 410, and provides a high impedance tending to maintain a constant arc current. The arc voltage in a particular embodiment is in the range of 100 volts. A starting voltage pulse with a magnitude of about 3000 volts is generated by a winding 452 magnetically coupled to inductor 450, and connected at one end to supply conductor 428, and at the other end to a grounded FET switch 454. the gate of FET switch 454 is connected to power converter control logic 428, for receiving a gate pulse therefrom upon application of a START command to control logic 428. The gate pulse causes current flow through winding 452, which induces a voltage pulse in inductor 450 with a polarity which forward-biases catch diode 448, to thereby bypass the voltage pulse around rectifier 442 by diode 448, whereupon the voltage pulse appears across arcjet electrodes 410 and 412 to initiate the arc. Once initiated, the arc is maintained by the high impedance of inductor 450 and the voltage provided by rectifier 442.

Also illustrated in FIG. 4a are conductors 458 and 460, which couple current (I) samples from switches 434a and 434b, respectively, to a power converter control logic 428. Current samples from diodes a and b of bridge rectifier 442 are provided to power converter control logic 428 over conductors 462 and 464, respectively, and a sample of the current through catch diode 448 is provided over a conductor 466. These three currents together constitute the total current in inductor 450, and therefore the sum of the three currents represents the arc current.

FIG. 4b is a simplified block diagram of a portion 468 of power converter control logic 428 of FIG. 4a. As illustrated in FIG. 4b, the logic includes an analog dividing circuit 470 as in the prior art, for generating an output signal establishing the arcjet arc current at a level which equals the arc current divided by the desired arc power. In FIG. 4b, a first input 472 of divider block 470 is a signal $I_{TOTAL}$ representing the total arc current. As illustrated, a summing circuit 474 sums current-representative signals from conductors 462, 464 and 466 to produce the current-representative signal $I_{TOTAL}$. According to an aspect of the invention, the desired arc power setting applied to a second input 476 of divider 470 is coupled thereto by a voltage follower 478 from a switch 480 connected to its input port 474. Switch 480 may be selectively connected to first and second taps 481 and 482, respectively, of a voltage divider designated generally as 484, which is connected between a voltage source $V_{in}$ and ground. As illustrated in FIG. 4b, voltage divider 484 includes resistors 485, 486, and 487, and produces a larger voltage (representing a larger power) at tap 481 than at tap 482 (representing lower arc power). Switch 480 is controlled by at least a component of the error signal from attitude control system 364 of FIG. 3, as suggested by dash-line 368. Thus, the same error or control signal which would control the ON-OFF state of a chemical thruster in a prior-art attitude control system is instead used, according to an aspect of the invention, for changing the arc power reference setting in a pulsed manner, thereby changing the arc current from a high current state to a low current state under the control of the known feedback loop, in a manner which corrects attitude.

FIG. 4c illustrates another embodiment of the invention, in which a continuous variation of arc power setting can be achieved, by a motorized voltage divider 494 corresponding to fixed voltage divider 484 of FIG. 4b. In FIG. 4c, the error signal controls the position of a wiper 490 in the direction of one of arrows 492, tapping a voltage from potentiometer 496 for application to voltage follower input port 479, as suggested by dash line 368.

In operation of the spacecraft of FIG. 2, any or all of arcjets 13, 14, 15 or 16 may be operated to produce stationkeeping thrust. As mentioned, the thrust will, in general, cause some undesired attitude changes. Attitude control system controller 364 of FIG. 3 generates error signals in response to deviations from the desired attitude. The error signals are applied to the appropriate one(s) of the power control units of the arcjet thrusters for reducing the arc magnitude to thereby reduce the thrust of that (those) thrusters to less than the maximum thrust of which they are capable. Ordinarily, at least three of the arcjets will be in operation, and at least two of the three will be modulated. The reduced thrust from one or some of the arcjets results in a torque which tends to restore the attitude. As mentioned above, control of the arcjets in this manner provides a combination of stationkeeping and attitude control thrust with a specific impulse greater than that which results from use of arcjets at maximum thrust combined with chemical thrusters for attitude control.

From time to time, it may be necessary to fire a chemical thruster(s) if the torque imbalance attributable to the arcjet thrusters is so large that the imbalance remains, even when the arcjets have been throttled back to the minimum arc which can be maintained without extinction.

While the invention has been described in the context of North-South stationkeeping, the principles of the invention are applicable to any maneuver in which a change in velocity ($\Delta V$) is desired, as for example drag make-up.

Other embodiments of the invention will be apparent to those skilled in the art. While a monopropellant system has been described, the principles of the invention may be used in a bipropellant context. While stationkeeping thrusters have been described as being on the north-facing face of the spacecraft, they could instead be on the south-facing side, as known in the art, whereupon they are energized around the descending node. The turns ratio of transformer 424 will be determined in part by the spacecraft bus voltage and the voltage-current characteristics of the arc. The number of power setting steps may exceed two. While two propellant tanks have been illustrated for redundancy, a single tank, or more than two tanks may be used.

What is claimed is:

1. A spacecraft, said spacecraft comprising:
   a body defining a side when in orbit;
   a supply of propellant;
   a chemical thruster connected to said supply of propellant and to said side of said body, for expelling propellant mass for generating thrust, whereby the attitude of said spacecraft may deviate from a desired attitude during said thrust;
   electrical arc generating means coupled to said thruster for increasing the enthalpy of said propellant mass; and
   attitude sensing means coupled to said body and to said electrical arc generating means for, without extinguishing said arc, modulating the magnitude of said arc in response to said deviations from said desired attitude for tending to reduce said deviations.

2. A spacecraft according to claim 1, wherein said electrical arc generating means includes:
   a controllable voltage source; and
   means for coupling said controllable voltage source to said thruster, and for presenting a high impedance to said electrical arc.

3. A spacecraft according to claim 2, wherein said means for coupling said controllable voltage source to said thruster includes an inductor.

4. A spacecraft according to claim 1, wherein said electrical arc generating means comprises:
   a source of electrical energy for energizing said arc;
   current sensing means for sensing the current of said arc to produce a current-representative signal;
   a source of reference signal representing the desired arc power;
   power determining means coupled to said current sensing means, to said source of electrical energy, and to said source of reference signal, for dividing said reference signal by said current-representative signal, for controlling said source of electrical energy.

5. A method for controlling a spacecraft comprising the steps of;
   operating the chemical portion of an arcjet thruster for generating propellant flow for velocity change;
   generating an electrical arc in said propellant flow of said arcjet thruster for increasing the specific thrust of said thruster;
   sensing the attitude of said spacecraft during said steps of operating the chemical portion and generating an electrical arc, and generating an error signal representative of the deviation of said attitude from a desired attitude; and
   controlling the power of said electrical arc in response to said error signal for tending to reduce said deviation of said attitude.

6. A method according to claim 5, wherein said step of controlling the power includes the step of controlling the power of said electrical arc between a plurality of nonzero values.

7. A method according to claim 6, wherein said step of controlling the power of said electrical arc between a plurality of nonzero values includes the steps of:
   sensing the arc current to produce a current-representative signal;
   generating a power reference signal representative of the desired arc power;
   dividing said power reference signal by said current-representative signal, to produce an arc-current drive signal;
   controlling said arc in a feedback manner in response to said arc-current drive signal; and
   changing said power reference signal in response to said error signal.

8. A method according to claim 5, wherein said step of operating the chemical portion includes the step of directing said propellant flow for north-south stationkeeping.

9. A method according to claim 5, comprising the further step of operating at least a second arcjet thruster in conjunction with said first mentioned arcjet thruster.

* * * * *